US010628864B2

(12) United States Patent
Josefiak

(10) Patent No.: US 10,628,864 B2
(45) Date of Patent: Apr. 21, 2020

(54) SYSTEM AND METHOD FOR CONSTRUCTING E-COMMERCE WEBPAGES FOR PURCHASE DECISION AND OFFER GENERATION

(71) Applicant: Frank Josefiak, Bonn Bad Godesberg (DE)

(72) Inventor: Frank Josefiak, Bonn Bad Godesberg (DE)

(73) Assignee: Deutsche Post AG, Bonn (DE)

( * ) Notice: Subject to any disclaimer, the term of this patent is extended or adjusted under 35 U.S.C. 154(b) by 761 days.

(21) Appl. No.: 14/738,437

(22) Filed: Jun. 12, 2015

(65) Prior Publication Data
US 2016/0364777 A1 Dec. 15, 2016

(51) Int. Cl.
*G06Q 30/06* (2012.01)
*G06Q 40/00* (2012.01)
*G06F 3/0484* (2013.01)
*G06F 17/28* (2006.01)

(52) U.S. Cl.
CPC ..... *G06Q 30/0611* (2013.01); *G06F 3/04842* (2013.01); *G06F 17/289* (2013.01); *G06Q 30/0641* (2013.01); *G06Q 40/123* (2013.12)

(58) Field of Classification Search
None
See application file for complete search history.

(56) References Cited

U.S. PATENT DOCUMENTS

| 6,460,020 | B1* | 10/2002 | Pool | G06F 17/2827 |
| | | | | 705/7.29 |
| 8,346,613 | B2* | 1/2013 | Raygoza | G06Q 20/12 |
| | | | | 702/186 |
| 2002/0156688 | A1* | 10/2002 | Horn | G06Q 10/10 |
| | | | | 705/27.1 |
| 2003/0200152 | A1* | 10/2003 | Divekar | G06Q 30/06 |
| | | | | 705/26.64 |
| 2004/0083143 | A1* | 4/2004 | Rodger | G06Q 30/0277 |
| | | | | 705/14.73 |

(Continued)

OTHER PUBLICATIONS

U.S. Appl. No. 14/527,547, filed Oct. 29, 2014, Frank Josefiak.

*Primary Examiner* — Scott A Zare
(74) *Attorney, Agent, or Firm* — Reinhart Boerner Van Deuren P.C.

(57) ABSTRACT

A system and method for constructing reverse e-commerce (Rev-eCom) webpages that allow consumers to easily evaluate products, construct offers, and complete purchases from merchants globally are provided. Such system and method utilize user preferences for language, currency, shipping method, etc., information contained on merchant website, and information from third party services in order to provide information from a merchant to the user in parameters that allow the user to properly evaluate the products and the actual costs in their currency that will be required to complete a purchase and delivery from a cross-border merchant. The customer may then make the offer to buy based on information from the constructed webpage. This allows the online user to be in full control of the logistic services he/she requires or prefers. The merchant then has the ability to receive a verified offer and to accept such offer made based on the user preferences.

27 Claims, 2 Drawing Sheets

(56) References Cited

U.S. PATENT DOCUMENTS

| | | | |
|---|---|---|---|
| 2008/0294536 A1* | 11/2008 | Taylor | G06Q 10/08 |
| | | | 705/28 |
| 2013/0085894 A1* | 4/2013 | Chan | G06Q 30/02 |
| | | | 705/26.64 |
| 2013/0218723 A1* | 8/2013 | Masud | G06Q 50/28 |
| | | | 705/26.62 |
| 2014/0297482 A1* | 10/2014 | Boone | G06Q 30/06 |
| | | | 705/27.1 |

* cited by examiner

SYSTEM AND METHOD FOR CONSTRUCTING E-COMMERCE WEBPAGES FOR PURCHASE DECISION AND OFFER GENERATION

FIELD OF THE INVENTION

This invention generally relates to systems and methods for constructing webpages, and more particularly to systems and methods for constructing e-commerce webpages that allow consumers to easily evaluate products, construct offers, and complete purchases from merchants globally.

BACKGROUND OF THE INVENTION

As the Internet continues to grow, consumers are able to access unprecedented amounts of information about the products and services produced worldwide. Unfortunately, while users are easily able to access such information and find details of such products, many of the websites which provide such information do not have any mechanism that allows the manufacturer to sell online. Indeed, private websites and small company's websites are often rich with information on the company's products, but void of any mechanism to purchase such products online.

Other companies have portals, company websites, and manufacturer pages that allow a consumer to order online, but only after a more or less intense registration process. At such sites the user has to give all of his or her personal information, banking data, etc. Once the consumer has registered with the website, he or she then has to select the product and amount to be ordered, the shipping method, etc., which greatly increases the time of the ordering process.

Even on such websites where products may be ordered through such a process, the user still may not complete the purchase if there is no trust in the sellers website, if the consumer requires shipping, payment methods or other features that are not offered by the merchant, if the consumer cannot order the amount desired, e.g. only one product desired in the case of a business to consumer (B2C) transaction on a business to business (B2B) website, or 1,000 units desired in the case of a B2B desired transaction on a B2C website. The transaction may also not be successful for other reasons, such as the product is not publically on sale, no pricing in the currency of the buyer is available, no description in the language of the buyer is available, the Taxes and Duties are unclear, no contact information is provided, and many other issues. Basically, all these issues can prevent a successful transaction even though the seller wants to sell and the consumer wants to buy.

While the preceding provides an overview of the challenges that often prevent successful e-commerce transactions, the following will provide more specific examples of some of the common issues that prevent completion of desired transactions.

In the following discussion the examples will use two hypothetical companies. The first is a small U.S. company called, e.g., "U.S. Seller" has a local website showing their vast product portfolio, including their specialty pipes, to their customers. Even if U.S. Seller is manufacturing high quality products in many different variances, the typical customer for this company located in the United States is also located in the U.S., is a native English speaker and pays in U.S. dollars. As such, the whole website is in English, prices are indicated in dollars ($) and shipping services are only available to US Customers (because U.S. Seller only offers shipping via FedEx, only within the U.S., and the shipping rates are also indicated only for this scenario). Furthermore, since sales are contemplated only to domestic customers, the only information for taxes relates to which State in which the consumer is located. No other Taxes and Duties information is provided to potentially interested cross border customers.

The second company in the following discussion is a small German company specializing in the manufacturing of high end bicycles called, e.g., DE Bikemaker, which employs a team of engineers developing new bicycles including all aspects of product development. Since a new bike prototype requires specially designed pipes, one engineer started looking for potential sources, as usual today, online. After she found only one manufacturer in the Netherlands whose prices were not really competitive, she started looking for alternatives. She was referred to U.S. Seller's website from an article she found online. After having searched on an online search engine, she now is on the website of U.S. Seller.

The first hurdle that is encountered that may result in a transaction not being completed is the language of the U.S. Seller's website. Because the engineer's English is not sophisticated enough to find all required information (the company in the Netherlands had a website in German), U.S. Seller is not considered as a material provider and is not further considered. In other words, the failure of the website to provide information in the language of the potential customer has resulted in a lost opportunity to make a sale.

If, however, the engineer were used to working through such a language hurdle, or if her English were good enough to determine the information that she needs, U.S. Seller might still make a sale. However, the engineer now faces another hurdle to successful completion of the transaction: Currency. That is, if she is able to read or translate the information on the website, she might find the pipes for which she is looking. Thereafter, she begins comparing their characteristics to the ones she has already found. Assuming that the pipes are technically the same to the ones in the Netherlands, she wants to compare their purchase against those in the Netherlands, but the prices are not comparable at all because of the different currencies used by the sellers. The price she has from the company in the Netherlands is in euros (€) while U.S. Seller's website displays their prices in dollars ($). Further, the pricing information provided on the website does not include any quantity or other discounts to the shown pricing as may be expected in a commercial transaction and as may already be possessed by the engineer from the potential supplier in the Netherlands. Again, at this point U.S. Seller may not be considered as a material provider and is not further considered. In other words, the failure of the website to provide information in the currency of the potential customer and the failure of the website to provide information regarding possible discounts based on quantity, etc. have resulted in a lost opportunity to make a sale.

If, however, the engineer were able to estimate the costs of her order or do a currency conversion, she might get comparable prices to those from the supplier in the Netherlands. Imaging that the engineer is curious and does the currency conversion and that U.S. Seller is still competitive, yet another hurdle is encountered to successful completion of the transaction: Shipping. Since there is no shipping option available on the U.S. Seller website to deliver products to Germany (even if the order volumes DE Bikemaker requires would make ocean freight delivery very reasonable and competitive to the company in the Netherlands), the engineer cannot compare the cost of such shipping. As such, at this point U.S. Seller may not be considered as a material provider and is not further considered. In other words, the failure of the website to provide information regarding the availability and cost of shipping to the location of the potential customer has resulted in a lost opportunity to make a sale.

If, however, the engineer were a logistics expert and were able to estimate the costs for shipping very realistically from the U.S. to Germany, and assuming that the outcome of that estimation leads to the fact that U.S. Seller is still competitive, the Engineer might continue with the potential transaction. However, still yet another hurdle is encountered to successful completion of the transaction: Taxes & Duties. That is, even if shipping costs can be estimated correctly, the Taxes & Duties that are required to import products into the EU are not included. Because the engineer knows that Taxes and Duties have to be paid for importing pipes into the EU, but because no information to that effect is provided, the engineer cannot compare U.S. Seller's pipes to those from the company in the Netherlands. As such, at this point U.S. Seller may not be considered as a material provider and is not further considered. In other words, the failure of the website to provide information regarding the Taxes & Duties of importing their products into the location of the potential customer has resulted in a lost opportunity to make a sale.

If, however, the engineer is also a Tax and Duty expert and as such is aware of the Tax and Duty relevance, she may be able (and willing) to find the required Harmonized System (HS) Code online, e.g. on the World Trade Organization (WTO) website. She may then be able and willing to search for the relevant Tax & Duty online, e.g. on dutycalculator.com. After all of that effort, however, she will again have to do a currency conversion, this time also including the estimated shipping costs. After all of this extra effort, none of which is required for the website of the company in the Netherlands, she may come to the conclusion that U.S. Seller still is very competitive. Based on this conclusion, she requires a detailed offer from U.S. Seller.

However, still yet a further hurdle is encountered to successful completion of the transaction: Contacting. In attempting to contact U.S. Seller regarding the required detailed offer, the engineer identifies that there is no electronic contact possibility provided the website. Like many current websites, only a physical address of U.S. Seller is provided. Because the engineer would most likely not be willing to write a mail inquiry to the company and wait for the return, at this point U.S. Seller may not be considered as a material provider and is not further considered. In other words, the failure of the website to provide electronic contact information has resulted in a lost opportunity to make a sale.

If, however, the engineer not only a Tax & Duty Specialist, Logistic Expert and Translation Master for Text and Currency, but she is also able to find the name of the owner of U.S. Seller and the electronic contact information for the owner online, e.g. on social media, she might decide to send an email regarding her inquiry to the owner of the company. However, still yet a final hurdle is encountered to successful completion of the transaction: Deciding & Reconfirmation. That is, when finally an email reaches the owner from Germany showing a great opportunity to him, the owner notes that there are various estimations from the engineer that he does not fully trust, e.g. the currency exchange rate may not be current when he reads the email and the shipping costs have been estimated way to high from his experience. In view of this questionable information, he may not be willing to take the effort of getting in touch with someone to explore the details and costs of shipping the goods to Germany, doing Customs clearance and so on. As such, he may simply not reply to the email or he may send a negative response.

If, however, the owner already had comparable requests and trusts in the numbers he sees from the engineer in Germany, including any price discounting requested by the engineer based on quantity of the potential order, he might actually close the deal.

Considering all of the hurdles discussed in the simplified example, and all of the "—buts", the likelihood of making a successful transaction is very small. Indeed, it is highly unlikely that such experience in all of the different fields discussed above is possessed by the typical buyer or engineer in such a business transaction. Further, it is even more unlikely that such information is possessed by and that such effort would be undertaken by an end consumer (as opposed to the business customer of the above example) to get a simple pricing estimation on a product from cross border.

As clearly illustrated above, the limitation is that a potential merchant has to put a lot of effort into selling products (especially globally) and therefore often does not even try to do so. Possibly worse yet, the merchant tries to supply all of the relevant information, but fails partly by not offering everything a potential customer requires. What is needed is a system and method to construct e-commerce webpages that can convert provided information and supply missing information relevant to a consumer to allow easy comparison and completion of a proposed transaction.

Embodiments of the present invention provide such a system and method. Indeed, embodiments of the present invention provide the buyer with the power to control the buying environment completely. Such systems and methods do not yet exist anywhere in the world. Because a principle behind such embodiments is bringing the power to sell from the seller to the buyer, i.e. enabling the buyer to make a holistic and reliable buying offer based on the provision of webpages that supply all of the relevant information as needed by the buyer, it is completely new and turns around the existing principles of doing business in the online world. Prior systems and methods of constructing webpages for e-commerce were based on the principle that only someone who wanted to sell something and also provided the required prerequisites (translation, currency, pricing, discounts, shipping, payments, Taxes and Duties, etc.), was able to sell something. With embodiments of the present invention, everyone could become a merchant, even if he/she did not intend to do so.

These and other advantages of the invention, as well as additional inventive features, will be apparent from the description of the invention provided herein.

BRIEF SUMMARY OF THE INVENTION

In one aspect, embodiments of the present invention provide new and improved systems and methods for constructing e-commerce webpages. More particularly, embodiments of the present invention provide new and improved systems and methods for constructing e-commerce webpages that that convert provided information from a merchant and that supply missing information relevant to a consumer to allow easy comparison and completion of a proposed transaction.

In another aspect, embodiments of the present invention provide the buyer with the power to control the buying environment completely via such constructed webpages. In one embodiment the constructed webpages bring the power to sell from the seller to the buyer by enabling the buyer to make a holistic and reliable buying offer based on the provision of webpages that supply some or all of the relevant information as needed by the buyer. With webpages constructed by embodiments of the present invention, everyone could become a merchant, even if he/she did not intend to do so.

Utilizing embodiments of the system and method of the present invention, any consumer globally may be enabled to complete business transactions with any merchant with the most suitable logistics solutions available. Indeed, through such embodiments the merchant would not need to be prepared for any e-commerce from his or her website at all. Through the use of such embodiment, the constructed webpage would enable such e-commerce via requests generated through such webpages by the potential customers directly.

In exemplary webpages generated by embodiments of the systems and methods of the present invention, the approach simply changes the way in which business is currently done. Such systems and methods, e.g. via a browser plugin or application, etc., construct webpages that include all necessary information that enable any user and potential customer to always make a reliable offer to a merchant to buy something from him. By reversing the typical e-commerce business process, the constructed webpage gives the power to the buyer to buy.

In one embodiment, a user defines his or her preferences concerning one or more of currency, address, shipping services (e.g. shipping carrier, time, costs, mode, etc.), payments accepted, etc. Thereafter, if the user finds an interesting product, the system and method of the present invention performs a search of the webpage/website on which the product is listed to collect relevant information (e.g. pricing, currency, location, buyer address, weight, dimensions, payments if available and/or shipping if available) from that merchant. After this, the system and method of the present invention constructs a webpage delivered to the user showing the final prices with the user-defined preferred shipping, payments, etc. information to the potential buyer. Some of the user-defined preferred information may be determined from the merchant's website, although likely much of the user-defined preferred information will not come from the merchant's website. If the user is interested, the user makes a time limited offer via the constructed webpage to the merchant. If the merchant accepts the proposed offer, including the user-defined preferred shipping, payment, price, etc., the merchant can make the deal with the customer, even if the merchant does not have a global (or even a local) e-commerce portal.

In an embodiment of the present invention, the system and method analyze a website on which the desired product is located for the displayed context and extracts the required and available information. If necessary, translation and currency conversion are performed on the information. Additionally, some or all of the shipping features, HS Code and Tax/Duty calculations as well as the possible payment solutions are determined and provided to the user. Unlike traditional e-commerce websites where all of the information and logistics are provided by the seller for the buyer to take or leave, embodiments of the constructed webpages of the present invention reverse the buying process. Now, the customer makes the offer to buy based on information from the constructed webpage, much of which has not been supplied or offered by the merchant. This allows the online user to be in full control of the logistic services he/she requires or prefers. The merchant then has the ability to accept such offer based on the user preferences.

In embodiments of the present invention, the system and method may be embodied in a standalone application (e.g. an app for a smartphone or tablet computer, which app may for instance comprise or interface with a browser), website, or a browser plug-in or add-on that could be installed by anyone on their browser. In addition to the browser plugin or application framework, an embodiment of the present invention includes or utilizes a website search engine for the information gathering process for current information not provided by the merchant website in accordance with the user preferences. One embodiment also includes various web-services for price calculation, shipping and payment proposing, as well as a messaging service (e.g. a messaging service that supports at least one of email, instant messaging, fax, paging, Short Message Service (SMS), WhatsApp, etc.) to inform the seller (merchant). In a further embodiment, the system and method of the present invention includes a logic engine on the backend for determining if the constructed offer is valid and if it could be fulfilled by the merchant (feasible).

One method for constructing a reverse e-commerce (RevEcom) webpage that allows a consumer to easily evaluate a product, construct an offer, and complete a purchase from a merchant website globally includes one or more of the steps of extracting information from the merchant website, converting the information to user preferred information based on predefined user preferences, determining available shipping options based on location of the merchant determined from the information, calculating taxes and duties that would be required if the products were purchased and constructing a user webpage containing the user preferred information, the shipping options, and the taxes and duties.

In order to reverse the typical e-commerce transaction, the method preferably includes providing a user selectable contact button. The method then includes the steps of generating an offer for purchase of the product upon selection of the contact button, and transmitting the offer to the merchant, e.g. via one or more of the exemplary messaging services described above. In order for the offer to be understood by the merchant, the method also includes the step of converting information in the offer from the user preferred information to a language and/or currency of the merchant prior to transmitting. In one embodiment the method includes the step of analyzing the information to determine contact information for the merchant.

In an embodiment the step of extracting the information from the merchant website includes the step of extracting the information from at least one of the merchant website's webpages, Hypertext Markup Language (HTML) code, registration, metadata, the merchant's social media, and online business information from third party websites.

In one embodiment the step of converting the information from the merchant website includes one or more of the steps of determining a language of text from the information, comparing the language of the text to a user preferred language, translating the language of the text to the user preferred language if the step of comparing the language indicates that the text is not in the user preferred language. Preferably, the step of converting also includes one or more of the steps of determining a currency of monetary values from the information, comparing the currency of the monetary values to a user preferred currency, and converting the monetary values to the user preferred currency when the step of comparing the currency indicates that the monetary values are not in the user preferred currency. In one embodiment, the step of translating the language of the text to the user preferred language includes the step of accessing an online third party translation service to perform the translation. In an embodiment the step of converting the monetary values to the user preferred currency includes the step of accessing an online third party currency conversion service to perform the conversion.

In one embodiment the step of determining available shipping options includes one or more of the steps of determining a location of the merchant from the information as a from-address, using a location of the user from the predefined user preferences as a to-address, extracting product shipping-relevant parameters from the information, and identifying existing shipping services and providers capable of shipping the product between the from-address and the to-address considering the product shipping-relevant parameters. Preferably, the step of extracting product shipping-relevant parameters includes the steps of searching for product characteristics that will affect shipping from at least one of a user product selection existing in a user shopping cart or the information, and/or querying at least one of the user or the user preferences regarding additional information that would affect shipping, including an amount of product, a characterization of desired delivery costs, delivery time desired, and/or whether or not tracking is desired.

In one embodiment the step of calculating taxes and duties includes one or more of the steps of analyzing the information for the product to be purchased to determine at least one of a product name, size, dimension, keywords, manufacturer, and country of origin, determining a destination from the user preferences, determining an HS Code based on the steps of analyzing and determining, and retrieving the taxes and duties from a tax and duty database. Preferably, the method further includes the step of determining if there is an export or import restriction on the product, and including the export or import restriction on the constructed webpage. In an embodiment the step of retrieving the taxes and duties includes the step of accessing a third party provided tax and duty database. In an alternate embodiment, the step of retrieving the taxes and duties includes the step of repeatedly, e.g. periodically, importing tax and duty information from a third party into an internal database.

In another embodiment of the present invention, a system for constructing a reverse e-commerce (Rev-eCom) webpage that allows a consumer to easily evaluate products, construct offers, and complete purchases from merchants globally, includes a non-transitory computer readable software element having computer readable instructions for preforming one or more of the steps of extracting information from the merchant website, converting the information to user preferred information based on predefined user preferences, determining available shipping options based on location of the merchant determined from the information, calculating taxes and duties that would be required if the products were purchased and constructing a user webpage containing the user preferred information, the shipping options, and/or the taxes and duties.

Embodiments also include an apparatus configured to perform or including respective means for performing one or more of the above-described methods of the present invention.

Other embodiments include an apparatus including at least one processor and at least one memory including computer program code. The memory and the computer program code is configured to cause, with the processor(s), an apparatus at least to perform one or more of the above-described methods of the present invention.

In another embodiment a program includes program code for performing one or more of the above-described methods of the present invention when the program is executed on a processor. Embodiments of the present invention also include a non-transitory computer-readable storage medium having such a program stored thereon.

Further, embodiments of the present invention include a non-transitory computer readable storage medium in which a computer program is stored. Preferably, the computer program, when executed by a processor, causes an apparatus to perform one or more of the above-described methods of the present invention.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
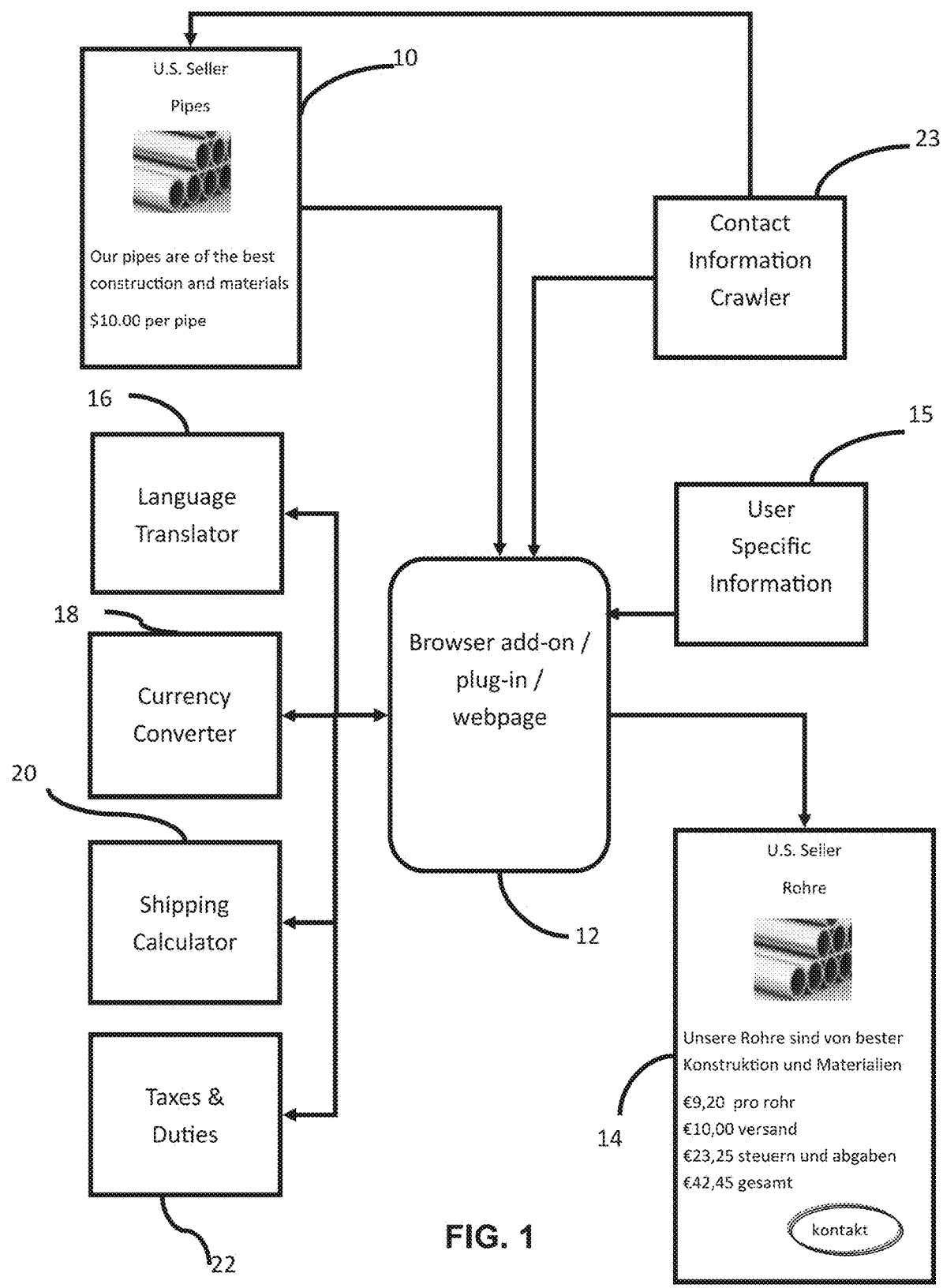
FIG. 1 is simplified schematic illustration of an embodiment of a system for constructing e-commerce webpages that allow consumers to easily evaluate products, construct offers, and complete purchases from merchants globally.

Turning now to the drawings, there is illustrated in FIG. 1 a simplified schematic diagram of one embodiment of a system for constructing e-commerce webpages that allow consumers to easily evaluate products, construct offers, and complete purchases from merchants globally. It should be noted that while the following description will discuss various embodiments of the present invention, such embodiments, operative environments, and exemplary situations to which these embodiments find particular applicability are provided by way of example and not by way of limitation. With this in mind, the discussion will now return to the example discussed above of the engineer for DE Bikemaker seeking to purchase pipes from the website of U.S. Seller, but in the context of the system and method of an embodiment of the present invention.

As may be seen in FIG. 1, the U.S. Seller webpage 10 contains some information about the pipes manufactured by this merchant. Since U.S. Seller is a U.S. company, the description is in English and the price per pipe is expressed in U.S. dollars. As will be discussed more fully below, the software element, e.g. browser add-on/plug-in/webpage, 12 of the present invention connects to the U.S. Seller webpage through a communications medium, e.g. the Internet, constructs a reverse e-commerce (ReveCom) webpage 14 that contains all of the information needed by the user to evaluate the U.S. Seller product and consider all of the associated costs in deciding to make the merchant an offer for purchase.

All such information is provided on the ReveCom webpage 14 in accordance with the user preferences 15 of language, currency, shipping carrier and method, and with the appropriate taxes and duties necessary to import the product if necessary. As may be seen, much of the information provided on the ReveCom webpage 14 does not exist on the original merchant webpage 10. Webpage 14 may for instance be displayed as an overlay to webpage 10, or in a separate browser window, or replaces display of webpage 10, to name but a few examples. Webpage 14 may for instance be generated and/or displayed automatically, or only upon user request.

In order to construct the ReveCom webpage 14, the system 12 utilizes various services to perform the necessary tasks to provide the required information in accordance with the user's preferences 15. Such services include language translation 16, currency conversion 18, shipping calculation 20, calculation of appropriate taxes and duties 22, and determining contact information for the seller 23. These services may be provided directly as part of the system of the present invention in one embodiment, or they may be provided by third-party providers to which the software element 12 connects via a communications medium, e.g. the Internet, in another embodiment as discussed below. Also a combination of one or more services being provided as part of the system and one or more services provided by third-party providers is possible.

Figure 2:
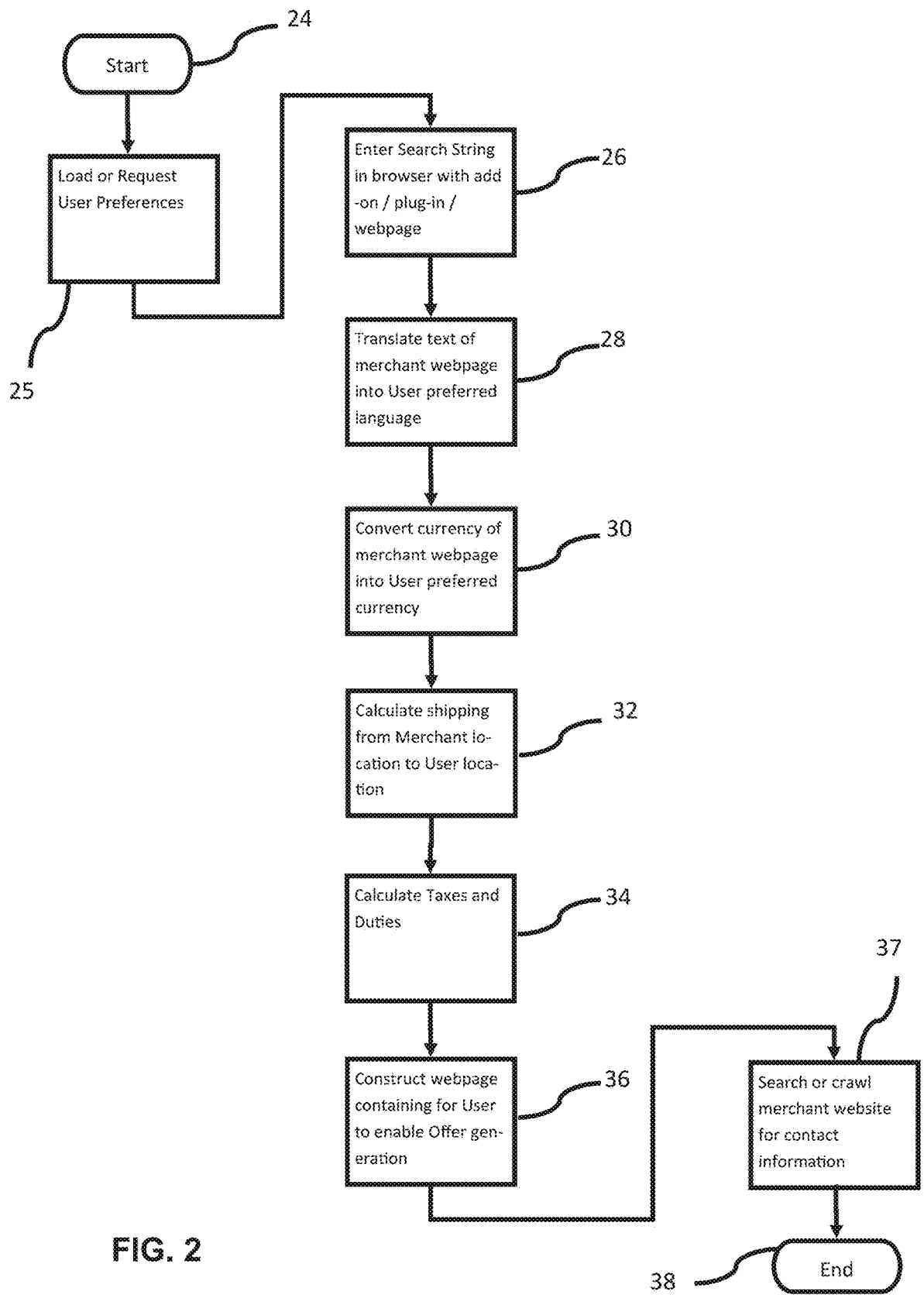
FIG. 2 is a simplified flow diagram illustrating the steps of a method for constructing e-commerce webpages that allow consumers to easily evaluate products, construct offers, and complete purchases from merchants globally in accordance with an embodiment of the present invention.

With this basic framework in mind, the discussion will turn to the example discussed above of the engineer who is looking, as before, for an alternative offer to allow comparison and possible purchase from U.S. Seller. Unlike the prior situation discussed in the Background, the method used as illustrated in FIG. 2, starts 24 by loading or requesting the user preferences 25 for the subsequent processing and calculations of the information necessary for the system to construct the ReveCom webpage 14 (see FIG. 1). While FIG. 2 illustrates this step 25 as a single step, those skilled in the art will recognize that the gathering or loading of such preferences may be iterative based on the information on the seller's website and the desired transaction. The engineer then enters the search string in her web browser at step 26 that is equipped with an embodiment of the present invention embodied in a so-called browser add-on or plug-in that offers enriched functionality. In an alternate embodiment, she may perform the search from a webpage that offers the same or similar enriched functionality provided by an embodiment of the present invention. In either event, the search directs her to the website of U.S. Seller.

As already stated above, the following steps 28-36 may then either be performed automatically, or only upon a user's (the engineer's) request. To this end, the add-on, plug-in, or website of the present invention may for instance provide a user interface element, e.g. a button that can be activated by the user to start the process of steps 28-36. This button may for instance be labelled like "Click this button to have an offer for purchase of this product prepared in your currency including shipping costs, taxes and duties". This may open a new browser window or an overlay to the existing webpage. In the following description, it is exemplarily assumed that the steps 28-36 are performed automatically.

Utilizing an embodiment of the present invention, a webpage is constructed (at step 36) from the U.S. Seller webpage including a translation into the user preferred language of the descriptions contained thereon at step 28. This overcomes the first hurdle of language that could derail the attempted transaction. This translation is derived via a provider of automatic translation services, e.g., Google Translate, in one embodiment. In another embodiment, the system translates the text directly. In a further embodiment, manual (e.g. human) translations, e.g. real-time translations as a service, may be provided.

In the embodiment that utilizes a third party translator service, the add-on, plug-in, or website of the present invention provides the country and preferred language of the engineer (which is German as retrieved from her account information or settings in the present example). The content of the website that needs to be translated (in combination with the language in which the website is written as retrieved from the HTML code inside) is also provided to the translation service. The webpage constructed in accordance with this embodiment utilizes the translated text to display to the engineer so that she may see the website in her known language. Preferably, an indication that this text is an automatic translation is also provided.

In addition to translation of the text, any cost information must also be translated at step 30 into the preferred currency of the engineer in order to avoid the second hurdle of currency that could derail the transaction. Because the U.S. Seller website states prices only in US dollars ($) as the currency instead of euros (€), the exemplary embodiment of the present invention triggers an up-to-date currency exchange rate converter. This currency rate converter may be provided by a third party service, similar to the language translator, or may be converted directly based on updated rate information from third party financial information. Based on the preferred currency of the engineer as set in the preferences or determined from the country based on the preference setting or from the location from where the user is logged into the plug-in as determined by, e.g., an IP Scan, the system takes all numbers with a currency designation and converts them to a value in euros (€) for the user. This information is displayed on the constructed webpage, and also preferably shown with an indication that it is calculated automatically.

In addition to the description of the goods and the price thereof, the shipping hurdle discussed above must also be overcome to prevent the transaction from being derailed. As such, this embodiment of the present invention is built upon a holistic database of existing shipping services and providers available on a global scale. All this shipping information is structured based on lanes (from-to relations), volume, weight or dimensional weight, and many further logistically relevant parameters. Such information is used to provide shipping information at step 32 for the desired transaction on the constructed webpage.

Based on the information provided so far, this embodiment of the system of the present invention only knows the lanes roughly, i.e. the U.S. to Germany. In order to improve the provided information, this embodiment searches/crawls the U.S. Seller website for further location information that match with language and currency (here English and dollars) to confirm that the sender is actually located in the US. This searching/crawling also identifies the postal contact address within the GTC of the website and sets that parameter as the pickup address. The delivery address is provided by the user preferences in one embodiment. In another embodiment the system prompts the user for the delivery address. Based on this information, all potentially existing lanes with all potentially existing shipping companies are selected.

Next, the system searches for product characteristics that will affect shipping either from the product selection(s)

existing in the shopping cart or from information on the website itself. If in doubt of the amount or other information that would affect shipping (method, carrier, cost, etc.), the system will prompt the user to enter further information on what she requires directly. Such information may include the amount (e.g. 250 m of piping, either taken from the cart or input from user), the estimated weight (e.g. 2500 kg, either taken from the product description stating that 1 m weights 10 kg or taken from user input), the characterization of the desired delivery costs (e.g. "as cheap as possible," "as fast as possible", etc. input from user, or combinations thereof, such as is described in co-pending application Ser. No. 14/527,547, entitled System and Method for Selection of Two Parameters via UI Element, filed Oct. 29, 2014, the teachings and disclosure of which are incorporated in their entireties by reference thereto), the delivery time desired (e.g. flexible as input from user), and whether or not tracking is desired (e.g. not required as input from user). Based on that information, the system displays all available shipping services with pricing and provider etc. on the constructed webpage. The user then selects the service she would like to use.

As discussed above, international transactions also include a hurdle in view of the Taxes & Duties that must be overcome to prevent the transaction from being derailed. To address this hurdle, step 34 calculates the taxes and duties by accessing various Tax & Duty Databases (some open to public, some not), or imports Tax & Duty information periodically for use. Once the relevant information is obtained, the system analyses the products desired to be purchased to obtain information on name, size, dimension, keywords, manufacturer, country of origin and destination either as discussed above via user and website information or by crawling the relevant HTML Code.

This information is transferred to a Fully Landed Cost Algorithm combined with the information of shipping costs and shipping provider. Internally within that Algorithm a similarity checkup is done to determine the most similar piping product is selected for the identification of an HS Code. If this process reveals a positive match, the correlating Taxes and Duties for the import into Germany and Export from the U.S. are retrieved. The system displays this information on the constructed webpage to provide the user with a detailed overview on the overall product price (in her currency), the shipping costs (also in her currency) and the total to be expected Taxes and Duty (also in her currency) summing up to the total costs. If there is an export or import Restriction on the items identified, the user will preferably be informed on that on the constructed webpage as well. Optionally, also the shipping time may be displayed on the constructed webpage, since this may be an important information for the user as well. This information may for instance be drawn from a database and/or from the Fully Landed Cost Algorithm.

Once all of the above hurdles have been cleared by the system of the present invention, there still remains the hurdle of contacting the merchant in order to allow the transaction to proceed. In order to obtain the contact information, the system searches or crawls the website of the merchant for any registration information, e.g. on the local registration entities, where website ownership is provided, at step 37. If that information is in agreement with other information retrieved from the website, e.g. with the contact information hidden somewhere in the website structure, or if that information is delivering a match within the social networks of the user, such contact information is displayed, e.g., as a contact button on the constructed webpage before ending 38. Such contact button enables the user to send her request directly to the owner of the goods. If no electronic contact information could be retrieved during this step, internally existing contact forms are offered in one embodiment, if the user would like to use that way to make contact with the merchant.

Finally, once an offer has been communicated from the user via the system of the present invention, the final hurdle that must be overcome relates to the deciding and reconfirmation from the merchant. Because prior to the approach provided by embodiments of the present invention, the receiver of the request needed to do almost all the above steps that resulted in an offer being sent again for reconfirmation because the merchant had no level of trust or fidelity in the offer. However, with the system of the present invention, the merchant gets a direct validated offer from his end customer provided via the system of the present invention. Such offer is "validated" because all critical, business impacting parameters have been calculated based on reliable information and not estimations. The shipping is as reliable as the Taxes and Duties and the payment. As such, the seller receives his money and is receiving what he/she requires from a seller's perspective, which is comparable with a Delivered Duty Paid (DDP) Solution.

In embodiments of the invention, the offer communicated from the user is digitally signed to allow the merchant as receiver of this signed offer to ensure integrity of the offer and/or authenticity of the user, of the plug-in or add-on or of a service provider that provides the ReveCom process (e.g. a company like for instance Deutsche Post DHL). For instance, the offer could be digitally signed with a private key of a public key infrastructure, e.g. in the form of a digital signature, and a corresponding public key could be provided with the signed offer or could be identified in the signed offer so that the merchant receiving the signed offer can use or obtain the public key for checking integrity and/or authenticity of the offer. The public key is for instance comprised in a certificate issued by a well-trusted certification authority (CA) and is provided with the signed offer or identified in the signed offer, so that the merchant receiving the signed offer can obtain it. In one embodiment the E-Post global system is used as a reliable communication channel.

Based on the certificate, the merchant is enabled to check whether the signed offer actually stems from a specific entity identified in the certificate (this entity for instance being the user, the plugin-in or add-on, or the provider of the ReveCom process) and/or has not been changed since the time of signing. For instance, the private key and the public key are associated with the provider of the ReveCom process. The private key may then for instance be integrated into the software or apparatus that implements the ReveCom process, e.g. in the plug-in or add-on, for instance in a secure manner to that it cannot be read out or manipulated. The same private key may be contained in a plurality of such software or apparatuses. Alternatively, each software or apparatus may be furnished with a different private key, while these private keys are then nevertheless bound to the same identity of the provider of the ReveCom process. In this way, a merchant receiving the signed offer can trust that the offer stems from a software or apparatus that is associated with the (trusted) provider of the ReveCom process, which may help the merchant to decide if the offer shall be accepted or not.

Because of this reliability of the information obtained by the system of the present invention, the seller now can be assured that he will get the price in his currency for his products as expected and that the shipping (covered by the end customer) is covered too. In this way, selling cross border can become an action of seconds instead of hours with certainty on the costs and all buying influencing parameters such as delivery methods, times, total costs, taxes, duties, restrictions and so on. All in a common language and currency for the buyer as well as for the seller.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All steps of methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As will be apparent from the foregoing description, the apparatus is, for example, software-configured in order to be able to carry out the method of the present invention. Software-configured is intended to be understood to mean, in particular, the preparation of the apparatus which is necessary in order to be able to carry out a method, for example in the form of a program on the processor. A processor is intended to be understood to mean, inter alia, one or more control units, microprocessors, micro control units such as microcontrollers, digital signal processors (DSP), Application-Specific Integrated Circuits (ASIC) or Field Programmable Gate Arrays (FPGA), etc. A memory is, for example, a program memory and/or a main memory of the processor. A program memory is intended to be understood to mean, inter alia, a non-volatile memory and a main memory to mean a volatile or non-volatile memory, in particular a random access memory (RAM) and/or a flash memory. Non-volatile memories are for example random access memories (RAM) such as for example NOR flash memories or sequential access memories such as for example NAND flash memories and/or read-only access memories (ROM) such as for example EPROM, EEPROM or ROM memories. The memory may, for example, be of tangible form.

As will also be apparent from the foregoing, the apparatus may for instance be an electronic device, e.g. a portable electronic device. Non-limiting examples of such a device are a computer (e.g. a desktop, laptop or tablet computer), a communication device like for instance a mobile phone or a smartphone, a television or a set-top-box. The apparatus may for instance comprise, implement or interface with a browser, in particular an internet browser. The apparatus may for instance comprise an interface for accessing the internet and/or other information networks, and/or for communicating messages, e.g. email, fax, SMS, paging and/or WhatsApp messages, to name but a few examples.

Further, a program is, for example, distributable via a network such as a local area network, a wide area network, a virtual network, a radio network, a telephony network and/or the Internet. A program can at least partially be software and/or firmware of a processor. For example, the program according to invention is stored in a memory of the apparatus according to the invention.

As will also be apparent from the foregoing, the storage medium is, for example, a computer-readable storage medium which contains the program according to the invention and is designed for example as a magnetic, electrical, electromagnetic, optical and/or other type of storage medium. The storage medium may, in particular, be a physical, a non-transitory and/or tangible storage medium. The storage medium is, for example, portable or permanently installed in an apparatus. The storage medium is, for example, of tangible form. "Computer-readable" is intended to be understood, to mean, in particular, that the storage medium can be read (out) or written by a computer or a data-processing apparatus, for example by a processor. The storage medium is, for example, a program memory of a processor.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for constructing a reverse e-commerce (RevECom) webpage that allows a consumer to evaluate a product, construct an offer, and complete a purchase from a merchant website of a merchant globally, the method comprising the steps of:
   extracting information from the merchant website;
   converting the information to user preferred information based on at least one of predefined and/or gathered user preferences;
   determining available shipping options based on location of the merchant determined from the information;
   calculating taxes and duties that would be required if the product were purchased;
   constructing a user webpage containing the user preferred information, the shipping options, and the taxes and duties;
   wherein the step of constructing further comprises a step of constructing the user webpage further containing a user selectable contact button, and wherein the method further comprises the steps of:
   generating an offer for purchase of the product upon selection of the contact button; and
   transmitting or triggering transmission of the offer to the merchant;

wherein the step of generating the offer further comprises converting the user preferred information in the offer to a language and currency of the merchant prior to the step of transmitting.

2. The method of claim 1, wherein the step of transmitting the offer to the merchant comprises a step of analyzing the information to determine contact information for the merchant.

3. The method of claim 1, wherein the step of extracting the information from the merchant website comprises the step of extracting the information from at least one of the merchant website's webpages, HTML code, registration, metadata, the merchant's social media, and online business information from third party websites.

4. The method of claim 1, wherein the step of converting comprises the steps of:
   determining a language of text from the information;
   comparing the language of the text to a user preferred language;
   translating the language of the text to the user preferred language when the step of comparing the language indicates that the text is not in the user preferred language.

5. The method of claim 4, wherein the step of translating the language of the text to the user preferred language comprises a step of accessing an online third party translation service to perform the translation.

6. The method of claim 1, wherein the step of converting comprises the steps of:
   determining a currency of monetary values from the information;
   comparing the currency of the monetary values to a user preferred currency;
   converting the monetary values to the user preferred currency when the step of comparing the currency indicates that the monetary values are not in the user preferred currency.

7. The method of claim 6, wherein the step of converting the monetary values to the user preferred currency comprises a step of accessing an online third party currency conversion service to perform the conversion.

8. The method of claim 1, wherein the step of determining available shipping options comprises the steps of:
   determining a location of the merchant from the information as a from-address;
   using a location of the user from the predefined user preferences as a to-address;
   extracting product shipping-relevant parameters from the information;
   identifying existing shipping services and providers capable of shipping the product between the from-address and the to-address considering the product shipping-relevant parameters.

9. The method of claim 8, wherein the step of extracting product shipping-relevant parameters comprises at least one of the steps of:
   searching for product characteristics that will affect shipping from at least one of a user product selection existing in a user shopping cart or the information;
   querying at least one of the user or the user preferences regarding additional information that would affect shipping, including an amount of product, a characterization of desired delivery costs, delivery time desired, and whether or not tracking is desired.

10. The method of claim 1, wherein the step of calculating taxes and duties comprises the steps of:
   analyzing the information for the product to be purchased to determine at least one of a product name, size, dimension, keywords, manufacturer, and country of origin;
   determining a destination from the user preferences;
   determining an HS Code based on the steps of analyzing and determining; and
   retrieving the taxes and duties from a tax and duty database.

11. The method of claim 10, further comprising the steps of:
   determining if there is an export or import restriction on the product; and
   wherein the step of constructing the user webpage containing the user preferred information, the shipping options, and the taxes and duties further comprises a step of constructing the user webpage containing the user preferred information, the shipping options, the taxes and duties, and the export or import restriction.

12. The method of claim 10, wherein the step of retrieving the taxes and duties comprises a step of accessing a third party provided tax and duty database.

13. The method of claim 10, wherein the step of retrieving the taxes and duties comprises a step of periodically importing tax and duty information from a third party into an internal database.

14. A non-transitory computer readable storage medium in which a computer program is stored, the computer program, when executed by a processor, causing an apparatus or system to perform a method for constructing a reverse e-commerce (Rev-eCom) webpage that allows a consumer to evaluate a product, construct an offer, and complete a purchase from a merchant website of a merchant globally, the method comprising:
   extracting information from the merchant website;
   converting the information to user preferred information based on at least one of predefined and/or gathered user preferences;
   determining available shipping options based on location of the merchant determined from the information;
   calculating taxes and duties that would be required if the product were purchased;
   constructing a user webpage containing the user preferred information, the shipping options, and the taxes and duties;
   wherein the step of constructing further comprises the step of constructing the user webpage further containing a user selectable contact button, and wherein the method further comprises the steps of:
   generating an offer for purchase of the product upon selection of the contact button; and
   transmitting or triggering transmission of the offer to the merchant;
   wherein the step of generating the offer further comprises converting the user preferred information in the offer to a language and currency of the merchant prior to the step of transmitting.

15. A system or apparatus for constructing a reverse e-commerce (Rev-eCom) webpage that allows a consumer to evaluate a product, construct an offer, and complete a purchase from a merchant website of a merchant globally, wherein the system or apparatus are configured to perform or comprise at least one processor and at least one memory including computer program code, with said at least one memory and said computer program code configured to, with said at least one processor, cause an apparatus at least to perform:

extracting information from the merchant website;

converting the information to user preferred information based on at least one of predefined and/or gathered user preferences;

determining available shipping options based on location of the merchant determined from the information;

calculating taxes and duties that would be required if the product were purchased;

constructing a user webpage containing the user preferred information, the shipping options, and the taxes and duties;

wherein the constructing further comprises constructing the user webpage further containing a user selectable contact button;

generating an offer for purchase of the product upon selection of the contact button; and transmitting or triggering transmission of the offer to the merchant;

wherein the generating the offer further comprises converting the user preferred information in the offer to a language and currency of the merchant prior to the transmitting.

16. The system or apparatus of claim 15, wherein the transmitting the offer to the merchant comprises analyzing the information to determine contact information for the merchant.

17. The system or apparatus of claim 15, wherein the extracting the information from the merchant website comprises extracting the information from at least one of the merchant website's webpages, HTML code, registration, metadata, the merchant's social media, and online business information from third party websites.

18. The system or apparatus of claim 15, wherein the converting comprises:

determining a language of text from the information;

comparing the language of the text to a user preferred language;

translating the language of the text to the user preferred language when the comparing the language indicates that the text is not in the user preferred language.

19. The system or apparatus of claim 18, wherein the translating the language of the text to the user preferred language comprises accessing an online third party translation service to perform the translation.

20. The system or apparatus of claim 15, wherein the converting comprises:

determining a currency of monetary values from the information;

comparing the currency of the monetary values to a user preferred currency;

converting the monetary values to the user preferred currency when the comparing the currency indicates that the monetary values are not in the user preferred currency.

21. The system or apparatus of claim 20, wherein the converting the monetary values to the user preferred currency comprises accessing an online third party currency conversion service to perform the conversion.

22. The system or apparatus of claim 15, wherein the determining available shipping options comprises:

determining a location of the merchant from the information as a from-address;

using a location of the user from the predefined user preferences as a to-address;

extracting product shipping-relevant parameters from the information;

identifying existing shipping services and providers capable of shipping the product between the from-address and the to-address considering the product shipping-relevant parameters.

23. The system or apparatus of claim 22, wherein the extracting product shipping-relevant parameters comprises at least one of:

searching for product characteristics that will affect shipping from at least one of a user product selection existing in a user shopping cart or the information; or querying at least one of the user or the user preferences regarding additional information that would affect shipping, including an amount of product, a characterization of desired delivery costs, delivery time desired, and whether or not tracking is desired.

24. The system or apparatus of claim 15, wherein the calculating taxes and duties comprises:

analyzing the information for the product to be purchased to determine at least one of a product name, size, dimension, keywords, manufacturer, and country of origin;

determining a destination from the user preferences;

determining an HS Code based on analyzing and determining; and retrieving the taxes and duties from a tax and duty database.

25. The system or apparatus of claim 24, wherein the system or apparatus are further configured to perform or wherein said at least one memory and said computer program code are further configured to, with said at least one processor, cause the apparatus to perform:

determining if there is an export or import restriction on the product; and wherein the constructing the user webpage containing the user preferred information, the shipping options, and the taxes and duties further comprises constructing the user webpage containing the user preferred information, the shipping options, the taxes and duties, and the export or import restriction.

26. The system or apparatus of claim 24, wherein the retrieving the taxes and duties comprises accessing a third party provided tax and duty database.

27. The system or apparatus of claim 24, wherein the retrieving the taxes and duties comprises periodically importing tax and duty information from a third party into an internal database.

* * * * *